United States Patent
Krauter et al.

(10) Patent No.: US 9,193,848 B2
(45) Date of Patent: Nov. 24, 2015

(54) FLAME-RESISTANT, UV-PROTECTED POLYCARBONATE MOULDING COMPOSITIONS OF LOW MOLECULAR WEIGHT DEGRADATION

(75) Inventors: Berit Krauter, Opladen (DE); Michael Wagner, Moers (DE)

(73) Assignee: Bayer Intellectual Property GmbH, Monheim (DE)

(*) Notice: Subject to any disclaimer, the term of this patent is extended or adjusted under 35 U.S.C. 154(b) by 137 days.

(21) Appl. No.: 13/883,019

(22) PCT Filed: Nov. 3, 2011

(86) PCT No.: PCT/EP2011/069289
§ 371 (c)(1),
(2), (4) Date: May 24, 2013

(87) PCT Pub. No.: WO2012/059528
PCT Pub. Date: May 10, 2012

(65) Prior Publication Data
US 2013/0245165 A1 Sep. 19, 2013

(30) Foreign Application Priority Data

Nov. 5, 2010 (EP) ..................... 10190144

(51) Int. Cl.
*C08K 5/42* (2006.01)
*C08K 5/3475* (2006.01)
*C08K 5/3492* (2006.01)

(52) U.S. Cl.
CPC .............. *C08K 5/42* (2013.01); *C08K 5/3475* (2013.01); *C08K 5/3492* (2013.01)

(58) Field of Classification Search
CPC ....... C08K 5/42; C08K 5/3475; C08K 5/3492
USPC ............................ 524/91, 100, 165
See application file for complete search history.

(56) References Cited

U.S. PATENT DOCUMENTS

| | | |
|---|---|---|
| 3,926,908 A | 12/1975 | Mark |
| 3,933,734 A | 1/1976 | Mark et al. |
| 3,940,366 A | 2/1976 | Mark |
| 3,953,399 A | 4/1976 | Mark |
| 4,104,246 A | 8/1978 | Mark |
| 4,185,009 A | 1/1980 | Idel et al. |
| 5,025,065 A | 6/1991 | Tacke et al. |
| 5,235,026 A | 8/1993 | Wulff et al. |
| 5,367,044 A | 11/1994 | Rosenquist |
| 5,449,710 A * | 9/1995 | Umeda et al. ........... 524/165 |
| 5,672,645 A | 9/1997 | Eckel et al. |
| 6,228,973 B1 | 5/2001 | McCloskey et al. |
| 6,353,046 B1 | 3/2002 | Rosenquist et al. |
| 6,613,869 B1 | 9/2003 | Horn et al. |
| 2002/0120092 A1 | 8/2002 | Kratschmer et al. |
| 2003/0069338 A1 | 4/2003 | Goossens et al. |
| 2004/0164446 A1 | 8/2004 | Goossens et al. |
| 2005/0250915 A1 | 11/2005 | Heuer et al. |
| 2007/0299169 A1 | 12/2007 | Ohira et al. |
| 2008/0081896 A1 | 4/2008 | Heuer |
| 2011/0112226 A1 | 5/2011 | Rudiger et al. |

FOREIGN PATENT DOCUMENTS

| | | |
|---|---|---|
| DE | 10 31 512 B | 6/1958 |
| DE | 25 00 092 A1 | 7/1976 |
| DE | 42 40 313 A1 | 6/1994 |
| DE | 19 943 642 A1 | 3/2001 |
| DE | 102007017936 A1 | 10/2008 |
| EP | 392252 A2 | 10/1990 |
| EP | 0517044 A2 | 12/1992 |
| EP | 0 640 655 A2 | 3/1995 |
| EP | 1308084 A1 | 5/2003 |
| EP | 1506249 A1 | 2/2005 |
| EP | 1582549 A1 | 10/2005 |
| EP | 1770126 A1 | 4/2007 |
| JP | 2006299057 A | 11/2006 |
| WO | WO-99/55772 A1 | 11/1999 |
| WO | WO-0226862 A1 | 4/2002 |
| WO | WO-2005113639 A1 | 12/2005 |
| WO | WO-2008037364 A1 | 4/2008 |
| WO | WO-2008/125203 A1 | 10/2008 |

OTHER PUBLICATIONS

International Search Report for PCT/EP2011/069289 mailed Feb. 17, 2012.

* cited by examiner

*Primary Examiner* — Kriellion Sanders
(74) *Attorney, Agent, or Firm* — Drinker Biddle & Reath LLP

(57) ABSTRACT

The present invention relates to flameproofed, UV-resistant polycarbonate moulding compositions having improved flame retardancy and a low incorporation of the UV absorber into the polymer chain and a resulting higher relative viscosity compared with the polycarbonates having increased incorporation of UV absorber, wherein the polycarbonate compositions comprise A) at least one polycarbonate having an average molecular weight $\overline{M}_w$ of from 18,000 to 40,000 g/mol,
B) one or more reactive UV absorbers and
C) at least one alkali metal or alkaline earth metal salt of a fluorinated organic acid, and C) has a content of free sulfate of less than 0.007 wt. % and a content of free fluoride of less than 0.017 wt.%, in each case based on the weight of C).

6 Claims, No Drawings

FLAME-RESISTANT, UV-PROTECTED POLYCARBONATE MOULDING COMPOSITIONS OF LOW MOLECULAR WEIGHT DEGRADATION

RELATED APPLICATIONS

This application is a national stage application (under 35 U.S.C. §371) of PCT/EP2011/069289, filed Nov. 3, 2011, which claims benefit of European application 10190144.5, filed Nov. 5, 2010, both of which are incorporated by reference herein.

The present invention relates to flameproofed, UV-resistant polycarbonate moulding compositions having improved flame retardancy and a low incorporation of the UV absorber into the polymer chain and a resulting higher relative viscosity compared with the polycarbonates having increased incorporation of UV absorber.

Due to the outstanding properties of plastics, such as e.g. transparency, toughness and low density coupled with thermoplastic deformability, which ensures a high design freedom, plastics are increasingly displacing metal as a material from various uses. This is happening in particular where a reduction in weight moves into the foreground. These materials are employed above all in aircraft construction, but also in rail transport or automobile construction. Plastics are furthermore also employed in IT and electrical engineering and electronics, where they are used e.g. as supports for current-carrying parts or for the production of television and monitor housings.

For the abovementioned uses, in many cases it is necessary for the plastics used also to have an increased flame resistance and a good resistance to UV rays, in addition to good mechanical properties. In order to achieve this, suitable additives, such as flameproofing agents and UV stabilizers, must be added to the plastics employed, which as a rule are combustible.

However, the addition of these additives brings with it not only the desired advantages. Thus, it is known to the person skilled in the art that when polycarbonates are treated with UV absorbers, these may be incorporated into the polymer chain. This happens in particular in the case of reactive UV absorbers, which have free functionalities, such as e.g. free hydroxyl groups, which can be incorporated into the polycarbonate chain.

Incorporation of the UV absorber in this context leads to a molecular weight degradation of the polymer, which can be determined via the relative solution viscosity.

Polycarbonates having a relatively low molecular weight as a rule also have poorer mechanical properties. Short-chain polycarbonates furthermore tend towards burning dripping in the UL94V test more so than long-chain polycarbonates. Due to the molecular weight degradation caused by incorporation of the UV absorber by esterification, a negative influence on the flameproofing properties is thus also obtained.

These problems described also exist for polycarbonate compositions which have been rendered flame retardant with the aid of alkali metal or alkaline earth metal salts, since the poor dripping properties here are primarily responsible for a negative evaluation in the flameproofing test.

EP 1 770 126 A1 describes aromatic polycarbonate compositions having good flame retardant properties and improved dripping properties on burning. The compositions comprise aromatic polycarbonate, a salt of a fluorinated organic acid which comprises free fluoride in a content of 0.2-20 ppm, and at least one further additive. On the other hand, EP 1 770 126 A1 does not describe compositions according to the present invention of polycarbonate, flame retardant and reactive UV stabilizer which comprise fluoride and sulfate in the stated amounts and have a reduced incorporation of the reactive UV absorber and an improved stability (low relative viscosity).

JP 06 299057 describes halogen-containing aromatic polycarbonate compounds which improve their transparency, flame properties and impact strength by the addition of alkali metal salts.

Polycarbonates having various alkali metal or alkaline earth metal sulfonates as flameproofing agents are known and are described, inter alia, in U.S. Pat. Nos. 3,933,734, 3,940, 366, 3,953,399, 3,926,908, 4,104,246 and EP392252.

US 2003/0069338 discloses flameproofed moulding compositions which comprise synergistic combinations of cyanoacrylates and flameproofing agents. The moulding compositions treated in this way are distinguished by an improved flame resistance and an improved stability to weathering.

WO 2008/125203 A1 describes a composition comprising polycarbonate and 2-[2-hydroxy-4-(2-ethylhexyl)oxy]phenyl-4,6-di(4-phenyl)phenyl-1,3,5-triazine as a UV absorber in combination with flameproofing additives.

However, all of these compositions have the disadvantages described above which are associated with the incorporation of the UV absorbers into the polymer.

The object of the present invention is therefore to provide UV-protected, flame-resistant polycarbonate moulding compositions of lower polymer degradation and resulting improved flame retardancy compared with the polycarbonates having an increased incorporation of UV absorbers of higher relative solution viscosity and improved mechanical properties. The relative solution viscosity here should be at most 2.00%, preferably at most 1.50%, further preferably at most 1.30% and very particularly preferably at most 1.10% lower than the relative solution viscosity of the pure polycarbonate which is used for the preparation of the particular total composition and to which component B) and C) have not been added (corresponding to 100% of component A) in the total composition).

In particular an object of the present invention is to provide polycarbonates which comprise as flameproofing agents alkali metal or alkaline earth metal salts of fluorinated organic acids in combination with at least one UV absorber, and which show a significantly reduced degradation of the polymer chain, wherein preferably more than 50 wt. % of the UV absorber originally employed is present in the free form in the polycarbonate and is not incorporated into the polymer chain.

An object of the present invention is furthermore to provide flameproofing agents having a low content of free fluoride and sulfate, and the use thereof for the preparation of UV-protected polycarbonate compositions.

The object described above is achieved, surprisingly, by a composition comprising at least one polycarbonate, at least one alkali metal or alkaline earth metal salt of fluorinated organic acids as a flameproofing agent and at least one reactive UV absorber, wherein the alkali metal or alkaline earth metal salt (component C)) has a content of sulfate of less than 0.007 wt. % and preferably additionally a content of free fluoride of less than 0.017 wt. %, in each case based on the total weight of component C).

In the context of the present inventions, the polycarbonates are employed as component A) in amounts of from 99.998 wt. % to 98.000 wt. %, preferably 99.949 wt. % to 98.400 wt. %, further preferably 99.890 wt. % to 98.900 wt. % and still further preferably 99.790 wt. % to 99.300 wt. %, and particularly preferably from 99.780 wt. % to 99.400 wt. %, in each case based on the total composition.

In the context of the present inventions, the UV absorbers are employed as component B) in amounts of from 0.001 wt. % to 1.000 wt. %, preferably 0.050 wt. % to 0.800 wt. %, further preferably 0.100 wt. % to 0.500 wt. %, and particularly preferably 0.200 wt. % to 0.400 wt. %, in each case based on the total composition.

In the context of the present inventions, the alkali metal or alkaline earth metal salts are employed as component C) in the moulding compositions in amounts of from 0.001 wt. % to 1.000 wt. %, preferably 0.001 wt. % to 0.800 wt. %, further preferably 0.010 wt. % to 0.600 wt. %, and still further preferably 0.010 wt. % to 0.300 wt. %, and particularly preferably 0.020 wt. % to 0.200 wt. %, in each case based on the total composition.

The sum of components A-C preferably adds up to 100.

In the context of the present invention, alkali metal or alkaline earth metal salts are derived from aliphatic or aromatic sulfonic acid, sulfonamide and sulfonimide derivatives. Thus, in the context of the present invention sodium or potassium perfluorobutane-sulfate, sodium or potassium perfluoromethanesulfonate, sodium or potassium perfluorooctane-sulfate, sodium or potassium 2,5-dichlorobenzene-sulfate, sodium or potassium 2,4,5-trichlorobenzene-sulfate, sodium or potassium methyl-phosphonate, sodium or potassium (2-phenylethylene)-phosphonate, sodium or potassium pentachlorobenzoate, sodium or potassium 2,4,6-trichlorobenzoate, sodium or potassium 2,4-dichlorobenzoate, lithium phenyl-phosphonate, sodium or potassium diphenyl sulfone-sulfonate, sodium or potassium 2-formylbenzenesulfonate, sodium or potassium (N-benzenesulfonyl)-benzenesulfonamide, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-(p-tolylsulfonyl)-p-toluenesulfimide potassium salt and N-(N'-benzylaminocarbonyl)-sulfanylimide potassium salt can.

Sodium or potassium perfluorobutane-sulfate, sodium or potassium perfluorooctane-sulfate, sodium or potassium diphenyl sulfone-sulfonate and sodium or potassium 2,4,6-trichlorobenzoate and N-(p-tolylsulfonyl)-p-toluenesulfimide potassium salt, N-(N'-benzylaminocarbonyl)-sulfanylimide potassium salt are preferred. (CAS no. 29420-49-3) is very particularly preferred. Potassium perfluoro-1-butanesulfonate is commercially obtainable inter alia as Bayowet® C4 from Lanxess, Leverkusen, Germany.

Suitable LTV absorbers in the context of the present invention are compounds of the formula (I), it also being possible for mixtures of differently substituted compounds to be employed, (I)

wherein $R^1$ and $R^2$ are identical or different and denote H, halogen, C1- to C10-alkyl, C5- to C10-cycloalkyl, C7- to C13-aralkyl C6- to C14-Aryl, —$OR^5$ or —(CO)—O—$R^5$, where $R^5$ is H or C1- to C4-alkyl, $R^3$ and $R^4$ are identical or different and denote H, C1- to C4-alkyl, C5- to C6-cycloalkyl, benzyl or C6- to C14-aryl, m is 1, 2 or 3 and n is 1, 2, 3 or 4.

UV absorbers which are furthermore suitable are compounds of the formula (II) and differently substituted mixtures (II)

wherein

R and X are identical or different and are H or alkyl or alkylaryl.

UV absorbers which are furthermore suitable are compounds of the formula (III) and differently substituted mixtures (III)

wherein $R^1$ and $R^2$ are identical or different and denote H, halogen, C1- to C10-alkyl, C5- to C10-cycloalkyl, C7- to C13-aralkyl, C6- to C14-Aryl, —$OR^5$ or —(CO)—O—$R^5$, where $R^5$ is H or C1- to C4-alkyl, m is 1, 2 or 3 and n is 1, 2, 3 or 4, bridge denotes $$-(CHR^{10})_p-\overset{O}{\underset{\|}{C}}-O-(Y-O)_q-\overset{O}{\underset{\|}{C}}-(CHR^{11})_p-$$

wherein p is 0, 1, 2 or 3, q is an integer from 1 to 10,

Y is —$CH_2$—$CH_2$—, —$(CH_2)_3$—, —$(CH_2)_4$—, —$(CH_2)_5$—, —$(CH_2)_6$—, or $CH(CH_3)$—$CH_2$— and $R^{10}$ and $R^{11}$ are identical or different and denote H, C1- to C4-alkyl, C5- to C6-cycloalkyl, benzyl or C6- to C14-aryl.

Preferred compounds of the formula (I), (II) and (III) are those where $R^1$=H, $R^2$=C1- to C8-alkyl, in particular $R^2$=isooctyl, $R^3$=H, $R^4$=H, m=1, n=4, R=H or 2-butyl or tert-butyl or —C(CH$_3$)$_2$-phenyl, X=C1- to C8-alkyl or —C(CH$_3$)$_2$-phenyl or isooctyl, p=0, 1, 2 or 3, q=1 to 8, Y=—(CH$_2$)$_6$— or —(CH$_2$)$_2$—, $R^{10}$=H and $R^{11}$=H.

The compounds according to formula (I), (II) and (III) to be used according to the invention are commercially obtainable. They can be prepared by known processes. Compounds of the formula (I), such as 2,2-methylene-bis-(4-(1,1,3,3-tetramethylbutyl)-6-(2H-benzotriazol-2-yl)phenol), are marketed commercially under the name Tinuvin® 360 or Adeka Stab® LA 31. Compounds of the formula (II) are 2-(2-hydroxy-5-tert-octylphenyl)-2H-benzotriazole (Tinuvin® 329), 2-(2H-benzotriazol-2-yl)-4-(1,1-dimethylethyl)-6-(2-methylpropyl)-phenol (Tinuvin® 350) or 2-[2'-hydroxy-3,5-di(1,1-dimethylbenzyl)phenyl]-2H-benzotriazole (Tinuvin® 234). The Tinuvins are obtainable from BASF AG, Ludwigshafen, Germany (formerly obtainable from Ciba Spezialitätenchemie, Lampertheim, Germany).

UV absorbers based on triazines can further more be employed.

Suitable polycarbonates for the preparation of the plastics composition according to the invention are all the known polycarbonates. These are homopolycarbonates, copolycarbonates and thermoplastic polyester carbonates.

The suitable polycarbonates preferably have average molecular weights $\overline{M}_w$ of from 18,000 to 40,000 g/mol, preferably from 22,000 to 31,000 g/mol and in particular from 26,000 to 28,000 g/mol, determined by measurement of the relative solution viscosity in methylene chloride (against polycarbonate standard) at a concentration of 5 g/l and a temperature of 25° C., using an Ubbelohde viscometer.

The preparation of the polycarbonates is preferably carried out by the interfacial process or the melt transesterification process, which are described in many instances in the literature. For the interfacial process, reference may be made by way of example to H. Schnell, Chemistry and Physics of Polycarbonates, Polymer Reviews, vol. 9, Interscience Publishers, New York 1964 p. 33 et seq., to Polymer Reviews, vol. 10, "Condensation Polymers by Interfacial and Solution Methods", Paul W. Morgan, Interscience Publishers, New York 1965, chap. VIII, p. 325, to Dres. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, p. 118-145 and to EP-A 0 517 044.

The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and in the patent specifications DE-B 10 31 512 and U.S. Pat. No. 6,228,973.

The polycarbonates are obtained from reactions of bisphenol compounds with carbonic acid compounds, in particular phosgene, or, in the melt transesterification process, diphenyl carbonate or dimethyl carbonate. Homopolycarbonates based on bisphenol A and copolycarbonates based on the monomers bisphenol A and 1,1-bis-(4-hydroxyphenyl)-3,3,5-trimethylcyclohexane are particularly preferred here. Further bisphenol compounds which can be employed for the polycarbonate synthesis are disclosed inter alia in WO-A 2008037364, EP-A 1 582 549, WO-A 2002026862, WO-A 2005113639

The polycarbonates can be linear or branched. Mixtures of branched and unbranched polycarbonates can also be employed.

Suitable branching agents for polycarbonates are known from the literature and are described, for example, in the patent specifications U.S. Pat. No. 4,185,009, DE-A 25 00 092, DE-A 42 40 313, DE-A 19 943 642, U.S. Pat. No. 5,367,044 and in literature cited herein. The polycarbonates used can moreover also be intrinsically branched, no branching agent being added here in the context of the polycarbonate preparation. An example for intrinsic branchings are so-called Fries structures, such as are disclosed for melt polycarbonates in EP-A 1 506 249.

Other aromatic polycarbonates and/or other plastics, such as aromatic polyester carbonates, aromatic polyesters, such as polybutylene terephthalate or polyethylene terephthalate, polyamides, polyimides, polyester-amides, polyacrylates and polymethacrylates, such as, for example, polyalkyl(meth)acrylates, and here in particular polymethyl methacrylate, polyacetals, polyurethanes, polyolefins, halogen-containing polymers, polysulphones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or of alpha-methylstyrene with dienes or acrylic derivatives, graft polymers based on acrylonitrile/butadiene/styrene or graft copolymer based on acrylate rubber (see, for example, the graft polymers described in EP-A 640 655) or silicone rubbers, can also be admixed to the polycarbonates and copolycarbonates according to the invention in a known manner, for example by compounding.

The conventional additives for these thermoplastics, such as fillers, heat stabilizers, antistatics and pigments, can be added in the conventional amounts to the polycarbonates according to the invention and the optional further plastics they comprise; if appropriate, the mould release properties or the flow properties can be further improved by addition of external mould release agents or flow agents (e.g. alkyl and aryl phosphites, phosphates, -phosphanes and low molecular weight carboxylates, halogen compounds, salts, chalk, quartz flour, glass fibres and carbon fibres, pigments and a combination thereof). Such compounds are described e.g. in WO 99/55772, p. 15-25, EP 1 308 084 and in the corresponding chapters of "Plastics Additives Handbook", ed. Hans Zweifel, 5th edition 2000, Hanser Publishers, Munich.

The preparation of a composition comprising polycarbonate and the additives mentioned is carried out by the usual incorporation processes and can be for example, by mixing solutions of the additives and a solution of the polycarbonate in suitable solvents, such as methylene chloride, haloalkanes, haloaromatics, chlorobenzene and xylenes.

The solution mixtures are preferably worked up, for example compounded, in a known manner by evaporating out the solvent and subsequent extrusion.

The composition can furthermore be mixed and subsequently extruded in conventional mixing devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

The compositions according to the invention can be worked up and processed to any desired shaped bodies in a known manner, for example by extrusion, injection moulding or extrusion blow moulding.

EXAMPLES

The content of sulfate and free fluoride was determined in accordance with DIN-ISO 17025. The solution viscosities were determined in accordance with the standard DIN-ISO 1628.

The content of free Tinuvin was determined via UV/Vis spectroscopy.

The polycarbonate was dissolved in methylene chloride (0.5 g of PC in 100 ml of methylene chloride) and the UV spectrum was measured in a cell having a thickness of D=2 mm.

Lanxess, Leverkusen, Germany, CAS no. 29420-49-3. Potassium perfluorobutanesulfonates of varying fluorine and sulfate content were employed. These potassium perfluorobutanesulfonates are preferably to be prepared by doping the flameproofing agent which has be purified by several recrystallizations.

For preparation of the examples, Makrolon® 2808 and substances B) and C) were initially introduced into a 250 ml two-necked flask in the amounts stated in Table 1. The contents of the flask were melted under a blanket of nitrogen in a hot metal bath of 340° C. with a static stirrer in the course of 10 minutes. The mixture was then stirred at this temperature for a further 15 minutes, so that a homogeneous mass was formed. When the time had expired, a sample was taken from the flask and the content of free Tinuvin and the relative solution viscosity were determined.

TABLE 1

| | Examples | | | | | | | |
|---|---|---|---|---|---|---|---|---|
| | | | | | C | | | |
| | A [g] | B [g] | [g] | Flameproofing agent | Sulfate [wt. %] (based on C) | Free fluoride [wt. %] (based on C) | eta rel. | Tinuvin 329 free [%] |
| Example 1 (comparison) | 50 | — | — | — | — | — | 1.289 | 0.00 |
| Example 2 (comparison) | 49.58 | 0.15 | — | — | — | — | 1.287 | 84.48 |
| Example 3 | 49.82 | 0.15 | 0.032 | C 1 | 0.005 | 0.006 | 1.278 | 54.55 |
| Example 4 | 49.82 | 0.15 | 0.032 | C 2 | 0.004 | 0.004 | 1.276 | 53.73 |
| Example 5 | 49.82 | 0.15 | 0.032 | C 3 | 0.006 | 0.011 | 1.275 | 52.78 |
| Example 6 (comparison) | 49.82 | 0.15 | 0.032 | C 4 | 0.013 | 0.017 | 1.256 | 23.26 |
| Example 7 (comparison) | 49.82 | 0.15 | 0.032 | C 5 | 0.007 | 0.022 | 1.255 | 18.07 |
| Example 8 (comparison) | 49.82 | 0.15 | 0.032 | C 6 | 0.009 | 0.033 | 1.249 | 17.50 |
| Example 9 (comparison) | 49.82 | 0.15 | 0.032 | C 7 | 0.014 | 0.038 | 1.240 | 19.54 |

As can be seen from Table 1, the compositions according to the invention have a high content of free UV absorber and a relatively high solution viscosity.

The Tinuvin 329 was recorded at the two wavelengths of 300 nm for the total amount employed and at 340 nm for the free content of Tinuvin. The amount of TIN 329 incorporated was determined from the difference of the products from the UV intensities at 300 nm multiplied by the factor 2.16 and at 340 nm multiplied by the factor 1.96. The factors were determined by calibration.

Determination of the relative solution viscosities (eta-rel): The relative solution viscosity eta rel is determined in methylene chloride (0.5 g of polycarbonate/l) at 25° C. in an Ubbelohde viscometer.

Preparation of the compositions for the examples given below:

Substances Used for the Preparation of the Compositions

A) Makrolon® 2808 is a commercially obtainable linear polycarbonate based on bisphenol A from Bayer MaterialScience AG. Makrolon® 2808 contains no UV absorber. The melt volume flow rate (MVR) according to ISO 1133 is 9.5 cm³/(10 min) at 300° C. under a 1.2 kg load.

B) Tinuvin® 329 is a of 2-(2H-benzotriazol-2-yl)-4-(1,1,3,3-tetramethylbutyl)-phenol and is commercially available as Tinuvin® 329 (CAS no. 3147-75-9) from BASF AG, Ludwigshafen, Germany (formerly obtainable from Ciba Spezialitätenchemie, Lampertheim, Germany).

C) is a potassium perfluoro-1-butanesulfonate and is commercially obtainable, for example, as Bayowet® C4 from

The invention claimed is:

1. A polycarbonate composition comprising
   A) at least one polycarbonate having an average molecular weight $\overline{M}_w$ of from 18,000 to 40,000 g/mol, used in amounts of from 99.998 wt. % to 98.000 wt. %,
   B) one or more reactive UV absorber, wherein the UV absorber B) is 2-(2H-benzotriazol-2-yl)-4-(1,1,3,3-tetramethylbutyl)-phenol) in an amount of from 0.001 wt. % to 1.000 wt. %, and
   C) potassium perfluoro-1-butanesulfonate having a content of free sulfate of less than 0.007 weight % and a content of free fluoride of less than or equal to 0.011 weight %, in each case based on the total weight of C), and wherein C) is used in an amount of from 0.001 wt. % to 1.000 wt. %, based on the total composition.

2. The polycarbonate composition according to claim 1, wherein more than 50 weight % of the UV absorber employed is present in the free form in the polycarbonate and is not incorporated into the polymer chain.

3. The polycarbonate composition according to claim 2, wherein the content of free UV absorber is at least 50%.

4. A method for preparation of the polycarbonate composition according to claim 1 comprising mixing C), with A) and B).

5. A shaped body comprising the polycarbonate composition according to claim 1.

6. The polycarbonate composition according to claim 1, wherein the relative solution viscosity is less than 2.00% lower than the relative solution viscosity of a composition containing 100% of compound A).

* * * * *